2,781,850

METHOD AND COMPOSITION FOR SELECTIVE PLUGGING OF OIL WELLS

Theodore J. Nowak, Fullerton, and Paul W. Fischer, Whittier, Calif., assignors to Union Oil Company of California, Los Angeles, Calif., a corporation of California No Drawing. Application June 21, 1954,
Serial No. 438,355

8 Claims. (Cl. 166—33)

This invention relates to the selective plugging of subterranean formations penetrated by a well bore, and in particular relates to an improved method and composition for selectively plugging water-producing formations which lie adjacent to or within oil-producing formations.

In a great many of the oil-producing areas of the United States, the production of petroleum is accompanied by the production of water or brine. Well effluents comprising as much as 90 percent water and only 10 percent of petroleum are by no means uncommon. The cost of pumping the water to the earth's surface and separating it from the oil represents an economic loss, and in many instances the problem of disposing of such waste water is more than one of mere economics.

Among the various methods which have been proposed for reducing the ratio of water to oil in such well effluents, those which have shown the greatest promise are based on the concept of introducing into the formations traversed by the well bore a material which will plug or seal water-producing formations without affecting adjacent or co-extensive oil-producing formations. Thus, it has been proposed to introduce resin-forming liquids into the formations, which liquids are capable of undergoing condensation or polymerization under the conditions prevailing in the well bore to form a solid which is soluble in oil but insoluble in brine. Upon placing the well in production the solid resin, being oil-soluble, will be dissolved out of the interstices of oil-bearing formations but will remain in the interstices of water-bearing formations and thereby shut off the flow of water therefrom. While some degree of success has been achieved with such method, the degree of selectivity attained has left considerable to be desired. For example, in U. S. Patent 2,366,036, wherein the resin-forming liquid comprised a partial condensation product of an alkylated phenol and formaldehyde, the treatment reduced the water-to-oil ratio of the well effluent only from 1.7/1 to 0.54/1 and the well effluent still contained 35% water.

It is accordingly an object of the present invention to provide an improved method for plugging subterranean water- or brine-producing formations without plugging adjacent or co-extensive oil-producing formations.

A further object is to provide selective plugging compositions which take the form of relatively mobile liquids but which undergo polymerization at well-bore temperatures and in the presence of water or brine to form water-insoluble resinous solids.

Other and related objects will be apparent from the following detailed description of the invention, and various advantages not specifically referred to herein will occur to those skilled in the art upon employment of the invention in practice.

We have now found that the above objects and related advantages may be realized through the provision and use of certain compositions which undergo polymerization in the presence of water or brine to form water-insoluble solids, but in the presence of oil either do not polymerize at all or polymerize to form liquid or semi-liquid products. More particularly, we have found that when liquid compositions essentially comprising styrene, pine oil or pinene, and certain metallic halide polymerization catalysts are injected into water-producing subterranean strata and allowed to remain therein for relatively short periods of time they undergo polymerization to form resin-like solids which are insoluble in water and which serve to plug the water-bearing interstices and shut off the flow of water into the well bore. In the presence of oil, however, such compositions remain relatively liquid, and hence are readily displaced from oil-bearing interstices upon placing the well back into production. The metal halide polymerization catalyst is selected from the class consisting of antimony trichloride and stannic chloride, and may be employed in conjunction with organic peroxides, e. g., benzoyl peroxide.

The invention thus consists in liquid plugging compositions essentially comprising styrene, pine oil or pinene and antimony trichloride or stannic chloride, and in a process wherein such compositions are injected into oil- and water-producing formations and allowed to polymerize therein to effect selective plugging of the water-producing formations. As is shown by the experimental data set forth in detail below, such compositions are relatively stable in the absence of water or brine, but in the presence thereof and under the conditions of pressure and temperature which prevail in most well bores they polymerize to form plastic or even hard resinous solids. Through the use of such compositions in accordance with the process of the invention it is possible to decrease the flow of water or brine from wells by 80% or better.

The plugging compositions of the invention are prepared simply by admixing the components thereof by conventional procedure. The pinene component may be a substantially pure product, but is usually employed as it occurs in ordinary commercial grade pine oil. Usually, the styrene component will comprise between about 50 and about 95 percent by weight of the entire composition, the pinene or pine oil will comprise between about 4 and about 45 percent, and the metal halide polymerization catalyst will comprise between about 0.05 and about 5 percent. When an organic peroxide polymerization catalyst is employed it is provided in an amount representing between about 0.01 and about 2 percent by weight of the entire composition. Benzoyl peroxide is preferred as such catalyst but other aromatic, naphthenic or paraffinic peroxide polymerization catalysts may be employed if desired. While the present plugging compositions are relatively stable and do not polymerize with any great rapidity in the absence of water, it is preferred that they be prepared within only a relatively short time prior to use.

The following table will illustrate the behavior of the present plugging compositions when subjected to conditions equivalent to those existing in well bores. In each of the experiments set forth in the table, three samples of the given composition were prepared simply by admixing the components. One of such samples (Sample A) was employed as such. The second sample (Sample B) was admixed with ½ volume of kerosene, and the third sample (Sample C) was admixed with ½ volume of 3% aqueous sodium chloride. All three samples were then stored for 24 hours at 160° F., after which they were examined and their appearance noted.

| Exp't. No. | Composition, percent | | Appearance after Storage 24 Hrs. at 160° F. | | |
|---|---|---|---|---|---|
| | | | Sample A | Sample B | Sample C |
| 1 | Styrene | 83.5 | Liquid | Liquid | Soft plastic+water. |
| | Pine Oil | 15.2 | | | |
| | SbCl$_3$ | 1.3 | | | |
| 2 | Styrene | 71.5 | ___do___ | ___do___ | Solid white resin+viscous liquid+water. |
| | Pine Oil | 26.9 | | | |
| | SbCl$_3$ | 2.6 | | | |
| 3 | Styrene | 82.0 | Slightly viscous | ___do___ | Soft plastic solid+water. |
| | Pine Oil | 14.8 | | | |
| | SbCl$_3$ | 1.6 | | | |
| | Benzoyl Peroxide | 1.6 | | | |
| 4 | Styrene | 80.6 | Viscous liquid | Two-phase liquid | Hard solid resin+water. |
| | Pine Oil | 14.6 | | | |
| | SbCl$_3$ | 1.6 | | | |
| | Benzoyl Peroxide | 3.2 | | | |
| 5 | Styrene | 71.5 | ___do___ | Liquid | Solid resin+water. |
| | Pine Oil | 26.9 | | | |
| | SnCl$_4$ | 2.6 | | | |
| 6 | Styrene | 97.6 | Hard solid resin | ⅔ hard, solid resin, ⅓ liquid. | Hard solid resin+water. |
| | SbCl$_3$ | 3.0 | | | |
| | Benzoyl Peroxide | 0.4 | | | |
| 7 | Styrene | 83.5 | Very soft solid | Liquid | Semi-liquid. |
| | Pine Oil | 16.5 | | | |

Sample A = Pure composition.
Sample B = Composition+½ vol. kerosene.
Sample C = Composition+½ vol. brine.

Various techniques may be employed for introducing the above-described selective plugging compositions into subterranean formations penetrated by a well bore. In general, the procedure comprises filling the bore hole with oil and introducing a charge of the plugging composition while displacing the oil from the bore at the top of the well casing. A separator is preferably employed to prevent admixing at the interface between the plugging charge and the oil. The plugging charge is followed up by a charge of oil, and when the plugging charge is opposite the formation to be treated the outlet at the top of the casing is closed and pressure is applied to the oil in the tubing to force the plugging charge out into the formation. The well is then allowed to stand under pressure for a period of time sufficient for the plugging composition to polymerize. As previously explained, and as demonstrated by the tabulated data above, polymerization occurs to form solid bodies in the presence of water, i. e., in the water-bearing interstices of the formations, but does not occur to form solids in the presence of oil, i. e., in the oil-bearing interstices. Upon subsequently placing the well in production, the plugging composition will be flushed from the oil-bearing formations by the flow of oil therefrom, but will be retained as a solid within the water-bearing formation.

Various modifications of the general procedure may be employed. If desired, the plugging composition may be confined to particular formations selected for treatment by the use of packers set between the tubing and casing above and/or below such formation. Also, the fluid employed to transmit pressure from the well head to the plugging charge may be of the so-called "non-penetrating" type. In some cases it may be desirable to repeat the treatment one or more times, i. e., after the initial treatment the well may be placed in production for a short period of time and thereafter given a second treatment with a second quantity of the plugging composition. Also, the plugging composition may be injected into the formations in two or more increments without intervening production periods, and the increments may have the same or different composition. In general, any of the well-known methods for forcing liquids into subterranean formations may be employed in practice of the present invention; the invention lies in the herein defined plugging compositions and in the use of the same to achieve the stated objects, rather than in particular manipulative steps.

The amount of plugging composition employed depends upon the length of the interval to be treated and the desired depth of penetration of the composition into the formations, and can readily be calculated from these values. The period of time required for the composition to polymerize and form a solid plug within the water-bearing formations depends primarily upon the conditions of time and temperature prevailing therein and upon the amount and nature of the polymerization catalyst. Usually, the latter is controlled so that the composition will polymerize to the solid state within about 12–48 hours, depending upon the depth and extent of the formations being treated, the method by which the composition is forced into the formation, and the physical and chemical characteristics of the formation.

The following example will illustrate the degree of plugging selectivity achieved through the use of the present compositions in accordance with the invention, but is not to be construed as limiting the invention.

*Example*

Two Ohio sandstone cores, 1" in diameter and 2" long, were leached with dilute hydrochloric acid to remove iron compounds, and were washed with distilled water and dried. A simulated water-bearing sand was prepared by saturating one of the cores (designated No. 1) with 3% aqueous sodium chloride. This core was found to have an initial permeability of about 232 md. at 160° F. A simulated oil-bearing sand was prepared by saturating the other core (designated No. 2) with 3% aqueous sodium chloride and thereafter flowing kerosene lengthwise through the core at a differential pressure of 600 p. s. i. The kerosene employed had solvent characteristics substantially identical with those of crude petroleum. The permeability of Core No. 2 was found to be about 89.4 md. at 160° F. Approximately 2 pore-volumes of the following plugging composition:

|  | Points by weight |
|---|---|
| Monomeric styrene | 45.0 |
| Pine oil | 3.2 |
| SbCl$_3$ | 0.8 |
| Benzoyl Peroxide | 0.1 | were then forced lengthwise through each of the cores under a pressure of 20 p. s. i. The two cores were then allowed to stand at 175° F. for 48 hours to allow the plugging composition to polymerize, after which Core No. 1 was backflowed with 3% aqueous sodium chloride and Core No. 2 was backflowed with kerosene. The backflow pressure gradient across the length of the cores was varied step-wise up to about 100 p. s. i., and at this pressure flow was continued until no further increase in the permeabilities of the cores to the flow of the respective fluids was observed. The final permeability of Core No. 1 was found to be about 46 md., and that of Core No.

2 to be about 104.2 md. The permeability recovery in each case was thus:

Core No. 1 _____ 46/232×100=19.8%
Core No. 2 _____ 104.2/89.4×100=117%

The degree of selectivity, determined by the ratio:

$$\frac{\text{Permeability recovery of oil-sand}}{\text{Permeability recovery of water-sand}}$$

was thus 117/19.8=5.9. It will be noted that the treatment effected about 80% plugging of the water-bearing sand, and actually increased the permeability of the oil-bearing sand. The latter phenomenon is believed to be due to the pore walls becoming coated with a thin polymeric layer which is preferentially oil-wettable and which hence actually increases the permeability to oil flow.

Other modes of applying the principle of our invention may be employed instead of those explained, change being made as regards the materials or methods employed provided the composition or steps stated by any of the following claims, or the equivalent of such stated compositions or steps, be obtained or employed.

We, therefore, particularly point out and claim as our invention:

1. A plugging composition for oil wells comprising between about 50 and about 90 percent by weight of styrene, between about 4 and about 45 percent by weight of a terpenic material selected from the class consisting of pinene and commercial grade pine oil, and between about 0.05 and about 5 percent by weight of a metallic halide selected from the class consisting of antimony trichloride, antimony tribromide, and stannic chloride.

2. A composition as defined in claim 1 wherein the metallic halide is antimony trichloride.

3. A plugging composition for oil wells comprising between about 50 and about 90 percent by weight of styrene, between about 4 and about 45 percent by weight of commercial grade pine oil, between about 0.05 and about 5 percent by weight of a metallic halide selected from the class consisting of antimony trichloride, antimony tribromide, and stannic chloride, and between about 0.01 and about 2 percent of an organic peroxide polymerization catalyst.

4. A composition as defined in claim 3 wherein the metallic halide is antimony trichloride and the organic peroxide is benzoyl peroxide.

5. The method of selectively plugging oil- and water-producing formations penetrated by a well bore to decrease the production of water therefrom which comprises injecting into said formations a composition as defined in claim 1, allowing said composition to remain in said formations until said composition has polymerized to at least a semi-solid stage, and thereafter placing the well in production.

6. The method of selectively plugging oil- and water-producing formations penetrated by a well bore to decrease the production of water therefrom which comprises injecting into said formations a composition as defined in claim 2, allowing said compositon to remain in said formations until said composition has polymerized to at least a semi-solid stage, and thereafer placing the well in production.

7. The method of selectively plugging oil- and water-producing formations penetrated by a well bore to decrease the production of water therefrom which comprises injecting into said formations a composition as defined in claim 3, allowing said composition to remain in said formations until said composition has polymerized to at least a semi-solid stage, and thereafter placing the well in production.

8. The method of selectively plugging oil- and water-producing formations penetrated by a well bore to decrease the production of water therefrom which comprises injecting into said formations a composition as defined in claim 4, allowing said composition to remain in said formations until said composition has polymerized to at least a semi-solid stage, and thereafter placing the well in production.

References Cited in the file of this patent

UNITED STATES PATENTS

| | | |
|---|---|---|
| 2,294,294 | Grebe | Aug. 25, 1942 |
| 2,335,912 | Burroughs | Dec. 7, 1943 |
| 2,349,210 | Traylor | May 16, 1944 |
| 2,366,036 | Leverett et al. | Dec. 26, 1944 |